United States Patent [19]

Exandier et al.

[11] Patent Number: 5,607,190

[45] Date of Patent: Mar. 4, 1997

[54] QUICK AND LEAKTIGHT JOINING DEVICE FOR TUBULAR PIPES

[75] Inventors: Philippe Exandier, Chalette; Denis Godeau, Vieilles Maisons/Joudry, both of France

[73] Assignee: Hutchinson, Paris, France

[21] Appl. No.: 398,378

[22] Filed: Mar. 3, 1995

[30] Foreign Application Priority Data

Mar. 4, 1994 [FR] France .................................. 94 02505

[51] Int. Cl.⁶ ...................................................... F16L 35/00
[52] U.S. Cl. ............................ 285/93; 285/308; 285/319; 285/321
[58] Field of Search ............................ 285/93, 308, 319, 285/321

[56] References Cited

U.S. PATENT DOCUMENTS

| | | |
|---|---|---|
| 4,925,217 | 5/1990 | Ketcham . |
| 4,948,176 | 8/1990 | Bartholomew . |
| 5,152,555 | 10/1992 | Szabo ........................................ 285/93 |
| 5,154,450 | 10/1992 | Washizu . |
| 5,209,523 | 5/1993 | Godeau ..................................... 285/93 |
| 5,219,188 | 6/1993 | Abe et al. .................................. 285/93 |
| 5,226,679 | 7/1993 | Klinger . |
| 5,226,680 | 7/1993 | Bahner ...................................... 285/93 |
| 5,228,724 | 7/1993 | Godeau ..................................... 285/93 |
| 5,228,728 | 7/1993 | McNaughton et al. ................... 285/93 |
| 5,275,443 | 1/1994 | Klinger . |
| 5,340,163 | 8/1994 | Merrer et al. ............................. 285/93 |
| 5,441,313 | 8/1995 | Kalahastny ............................. 285/319 |
| 5,472,242 | 12/1995 | Petersen ................................... 285/93 |

FOREIGN PATENT DOCUMENTS

| | | |
|---|---|---|
| 2654489 | 5/1991 | France . |
| 4035581 | 5/1991 | Germany . |
| 4101757 | 7/1991 | Germany . |

*Primary Examiner*—Eric K. Nicholson
*Attorney, Agent, or Firm*—Bell, Seltzer, Park & Gibson

[57] ABSTRACT

A quick and leaktight joining device for tubular pipes having two tubular elements to be joined together, a device for locking in the joined condition, and a connection and/or locking telltale which can move between a first, visible, position and a second, concealed, position. Upon joining, one of the tubular elements to be joined and/or a locking device ensure(s) that the telltale is driven from the first, visible, position into the second, concealed, position. The quick and leaktight joining device is used, particularly in the motor industry for joining an engine cooling circuit to the water box of a unit heater or to the joining of a medium-pressure oil circuit of a motor vehicle power-assisted steering circuit.

9 Claims, 11 Drawing Sheets

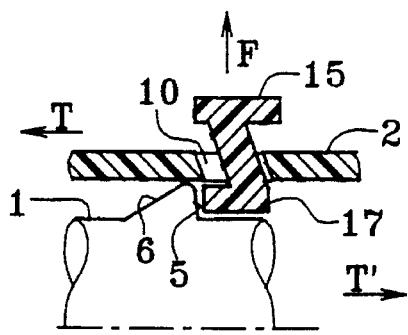
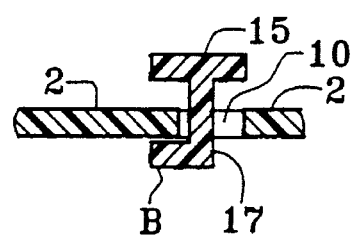
FIG.7a  FIG.7b
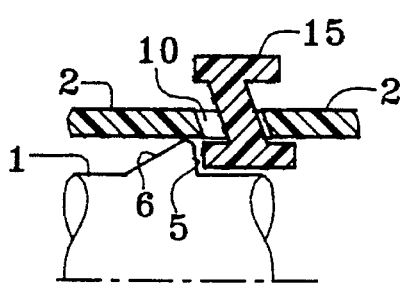
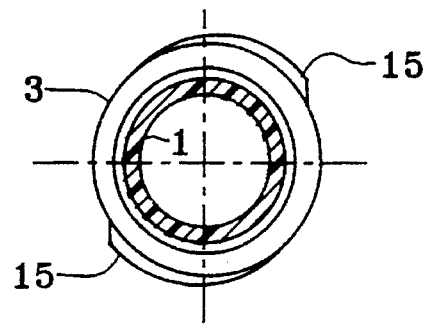
FIG.7c  FIG.8
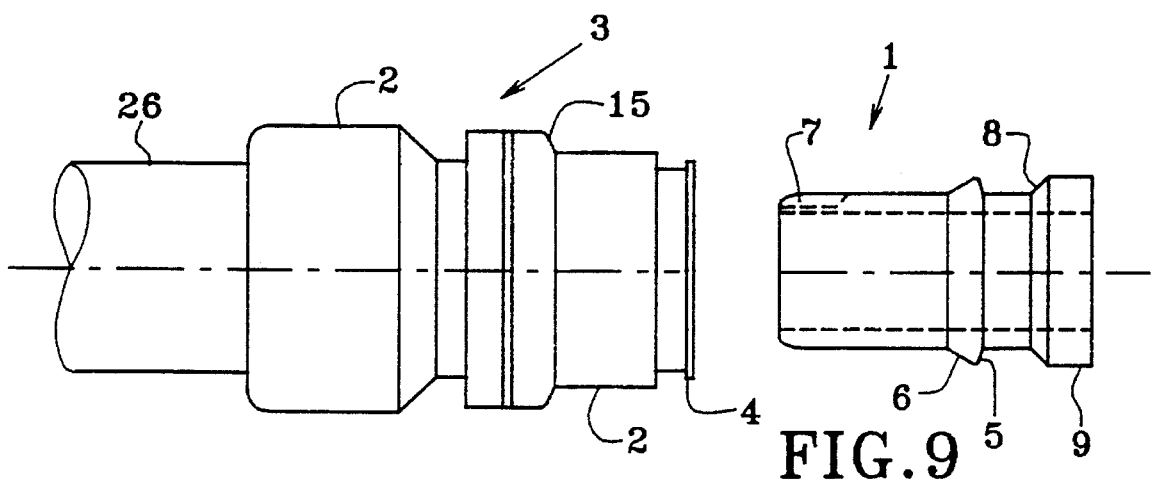
FIG.9
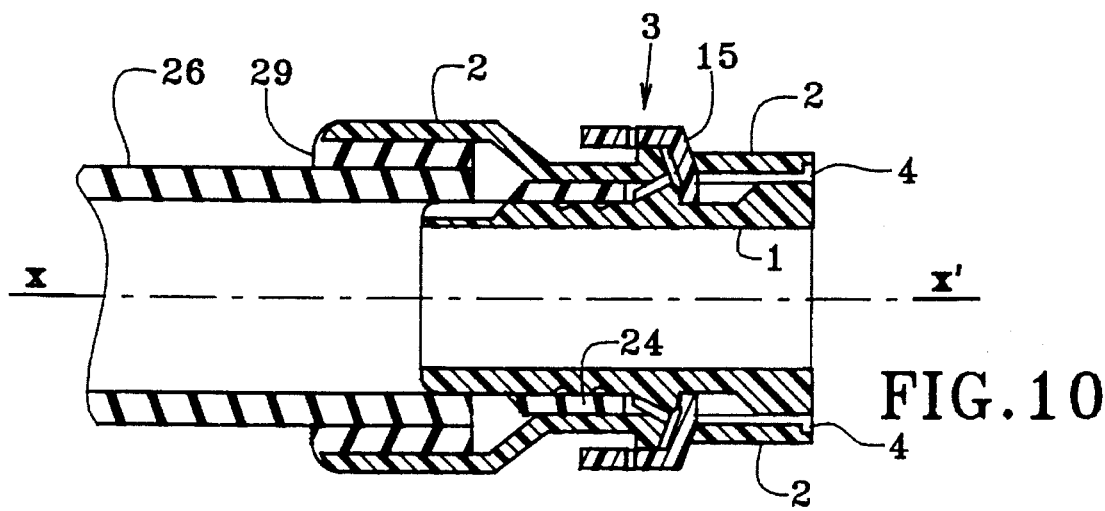
FIG.10

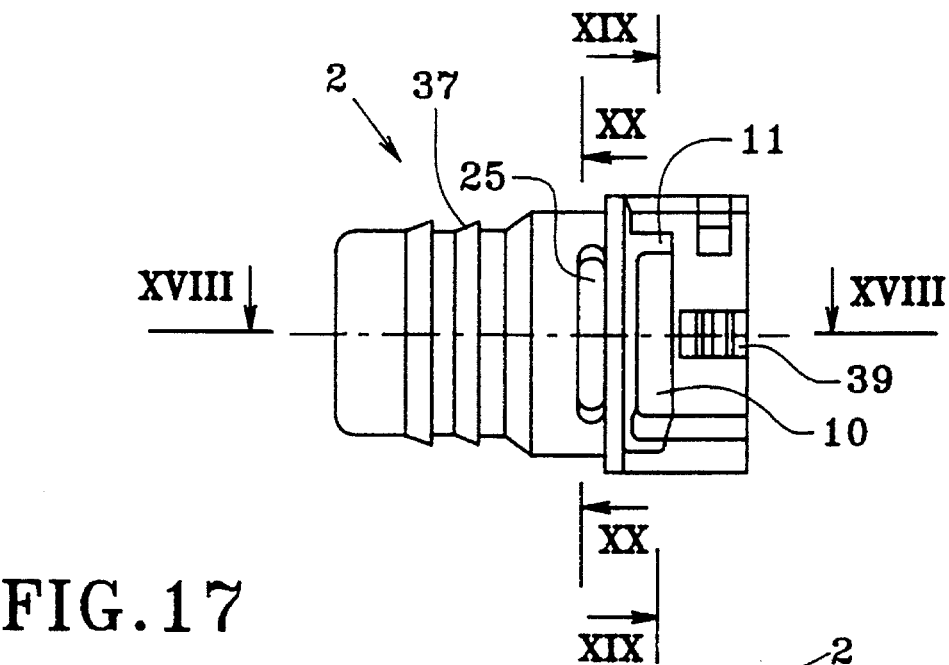
FIG. 17
FIG. 18
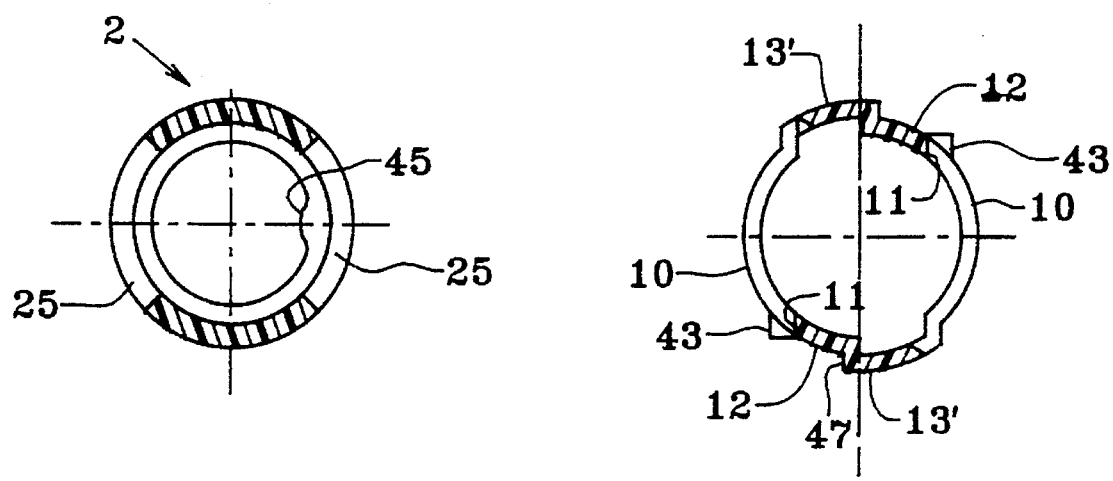
FIG. 20
FIG. 19

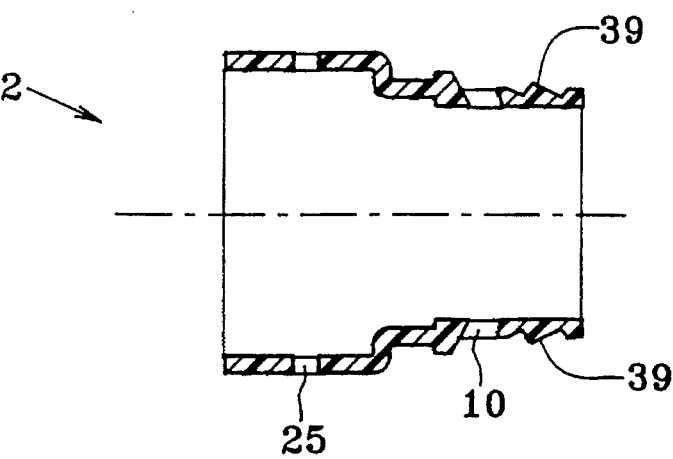
FIG.22
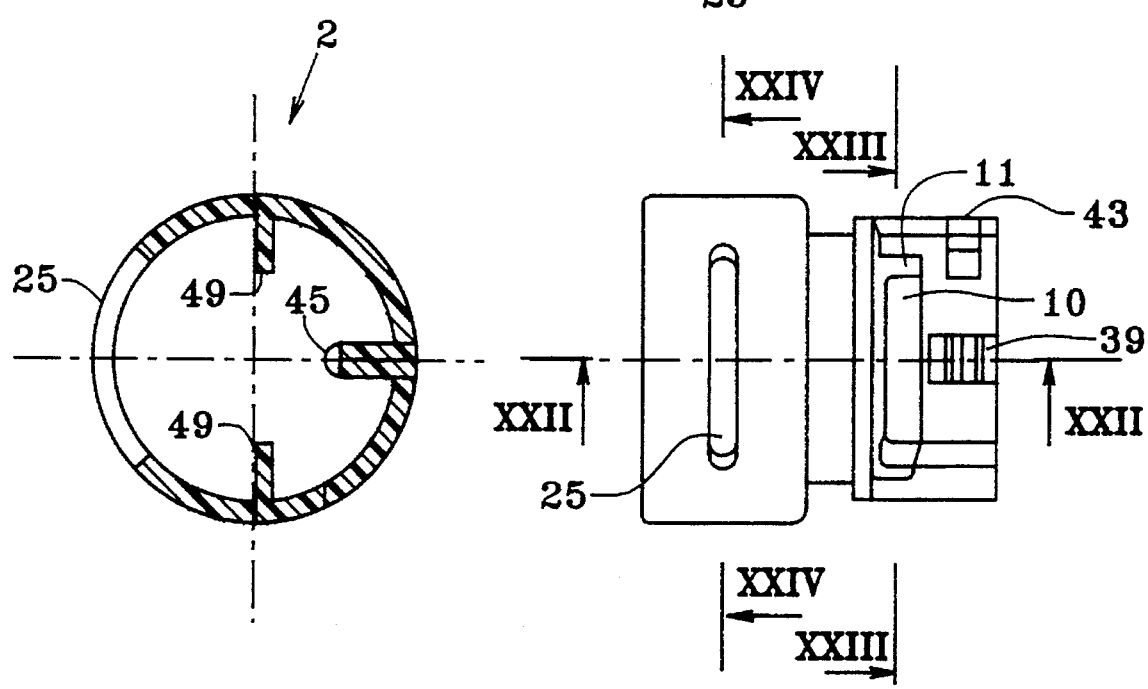
FIG.24
FIG.21
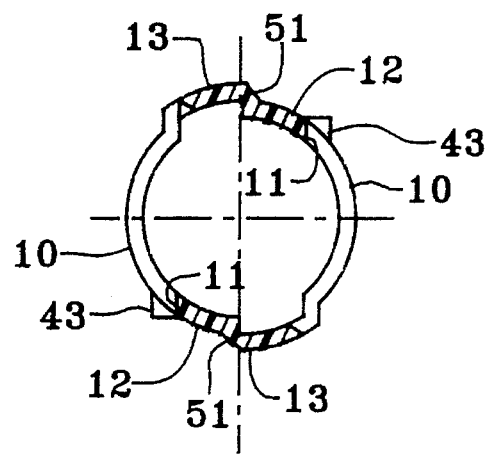
FIG.23

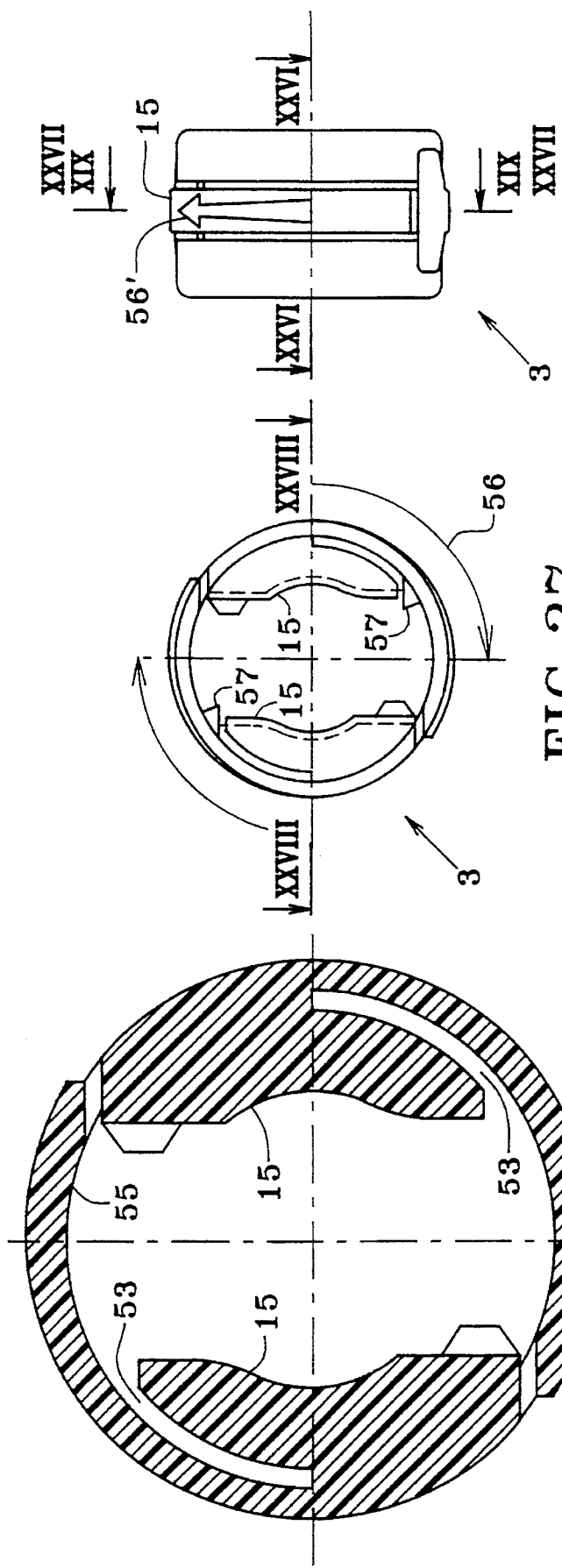
FIG. 25
FIG. 27
FIG. 29
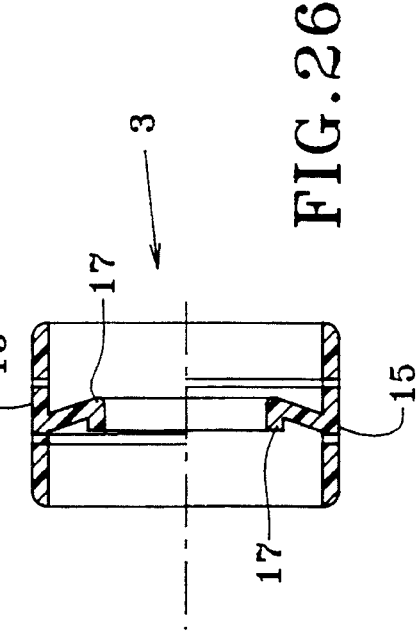
FIG. 26
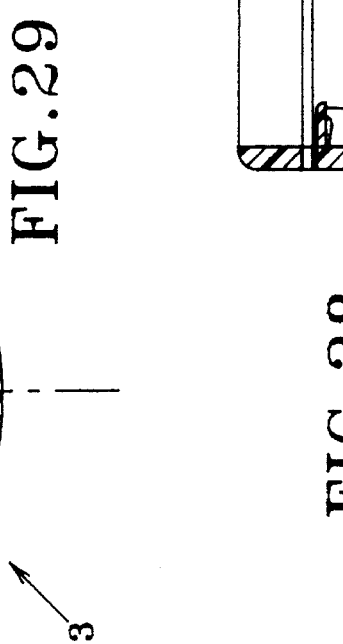
FIG. 28

QUICK AND LEAKTIGHT JOINING DEVICE FOR TUBULAR PIPES

FIELD OF THE INVENTION

The present invention relates mainly to a quick and leaktight joining device for tubular pipes.

BACKGROUND OF THE INVENTION

In many fields, particularly in the motor industry, it is of prime importance to be able to join tubular pipes together rapidly, and in a perfectly leaktight, secure and tellable manner. These pipes may, for example, belong to a pneumatic circuit, to a hydraulic circuit conveying water at low or medium pressure, at ambient or high temperatures, such as the engine cooling circuit for example, or may alternatively belong to an oil circuit, such as a power-assisted steering circuit, for example.

In order to ensure that connection has been made correctly, it has been proposed to equip the joining device with a locking telltale having a first position, before joining, and a second position, in the joined and locked condition. However, the distinction between these two positions is not always obvious to the worker tasked with making the join nor for the robot in the case of a robotized assembly the.

As a consequence, one object of the present invention is to offer a leaktight, secure and tellable device for joining tubular pipes.

Another object of the present invention is to offer such a device which can be equipped with an unambiguous connection and locking telltale.

SUMMARY OF THE INVENTION

These objects are achieved according to the invention by a joining device comprising two tubular elements to be joined together, a device for locking in the joined condition, and a connection and/or locking telltale which can move between a first, visible, position and a second, concealed, position. Upon joining, one of the tubular elements to be joined and/or a locking device ensure(s) that the telltale is driven from the first, visible, position into the second, concealed, position.

Advantageously, the locking device includes a ring comprising at least one lug penetrating into a slot formed in a first of the tubular elements to be joined and bearing on a retaining element, particularly a shoulder, of the second tubular element to be joined.

Advantageously, the locking ring includes a region for accommodating the telltale in the second position, and conceals it.

The main subject of the invention is a device for sealed joining of a first tubular element with a second tubular element for a fluid circuit, including means for locking the first and second tubular elements in a joined condition and a joined and/or locked telltale, wherein the telltale includes a ring which is visible before joining, and wherein the device includes a component concealing the ring of the telltale after the first and second tubular elements have been joined together.

Another subject of the invention is a joining device, characterized in that the first tubular element is a male joining piece comprising an outgrowth including a ramp on one flank turned towards the joining end and a retaining element and, in particular, a shoulder on the opposite flank, in that the second tubular element has, at its joining end, an inside diameter slightly greater than the outside diameter of the male joining piece and includes at least one slot, in that it further includes a locking ring surrounding the second tubular element comprising at least one elastic lug which, at least in the joined condition, passes through the slot of the second tubular element, in that, upon joining, the lug or lugs is (are) pushed back by the ramp then is (are) locked by the retaining element, and in that the joining and/or locking telltale include(s) a ring which is visible in the unjoined condition, and an element which is pushed back, upon joining, by the male joining piece so that the ring of the locking or joining telltale becomes housed in the locking ring which conceals its presence.

Another subject of the invention is a device, characterized in that the lugs in axial section have a Z shape, in which the end of the inner horizontal bar is turned in the opposite direction from the joining end of the second tubular element.

Another subject of the invention is a device, characterized in that the lug or lugs and the slot or slots made in the second tubular element have an elongate shape and are arranged radially about an axis of the joining device, and in that the end of each lug and/or the edge of each slot include(s) a ramp making it possible to turn the locking ring, disengaging the lugs from the retaining element of the male joining piece in order to disconnect the joining device.

Another subject of the invention is a joining device, characterized in that the locking ring and the second tubular element have a relative configuration on the basis of which the lugs return, by elasticity, into the slots or slots of the second tubular element in order to reset the locking device automatically.

Another subject of the invention is a device, characterized in that the locking ring and the second tubular element have a second stable relative configuration in which the lugs rest on the outer surface of the second tubular element, the relative configuration on the basis of which the lugs return, by elasticity, into the slot or slots of the second tubular element being a configuration which is intermediate in angular terms between the condition in which the lug or lugs penetrate(s) into the slot(s) of the second tubular element, and the second stable relative configuration.

Another subject of the invention is a joining device, characterized in that the joining or locking telltale is removable.

BRIEF DESCRIPTION OF THE DRAWINGS

Another subject of the invention is a joining device, characterized in that the joining or locking telltale includes means for return to the visible position after disconnection.

Another subject of the invention is a device, characterized in that the second tubular element includes means for axially immobilizing the locking ring in terms of translation, preventing the axial translation of the locking ring relative to the second tubular element.

Another subject of the invention is a device, characterized in that the second tubular element includes means for guiding the locking ring in translation between a relative condition in which the lugs rest on the outer surface of the second tubular element and a locked condition in which these lugs are engaged in the slot or slots formed in the second tubular element.

Figure 1:
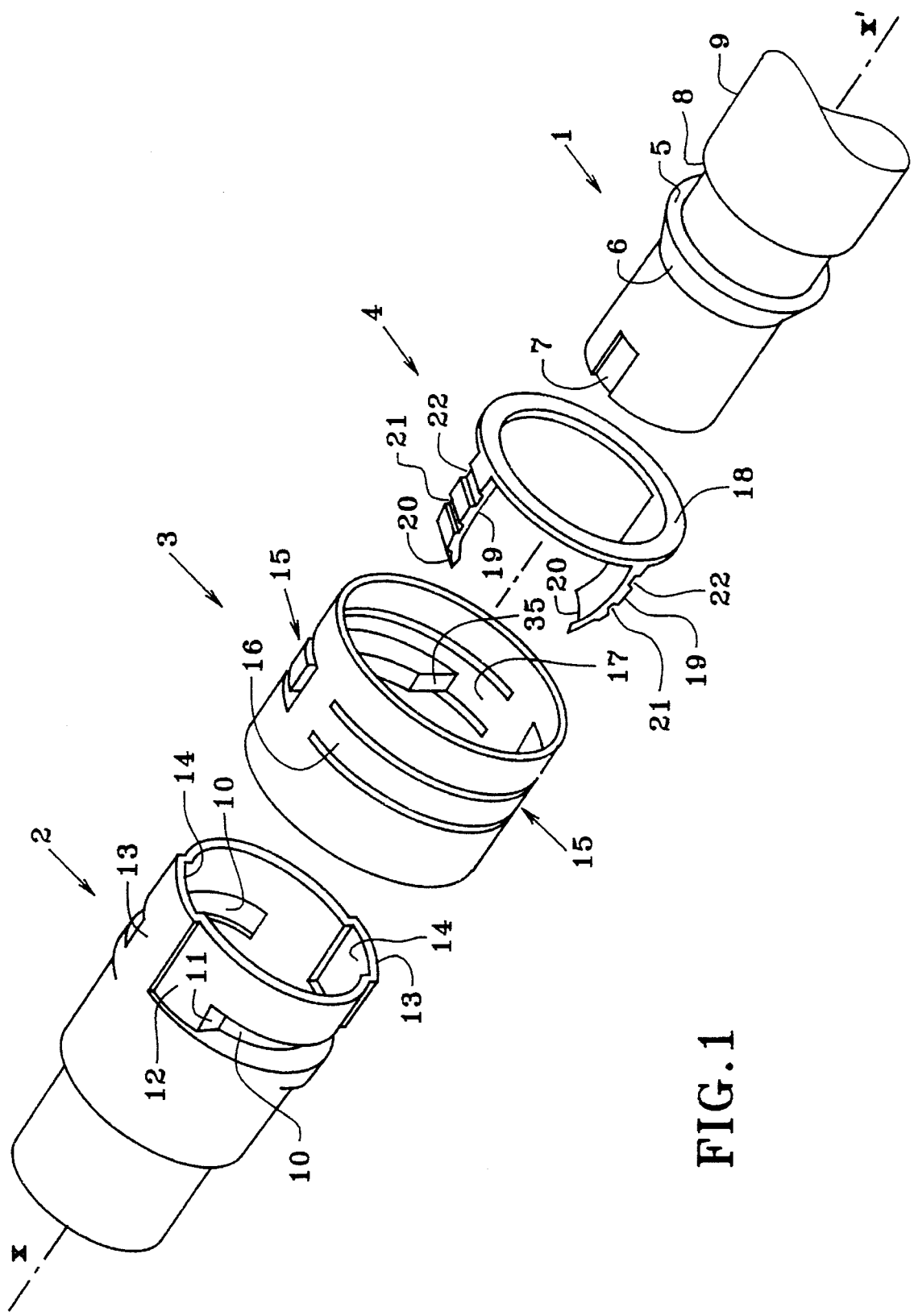
Figure 2:
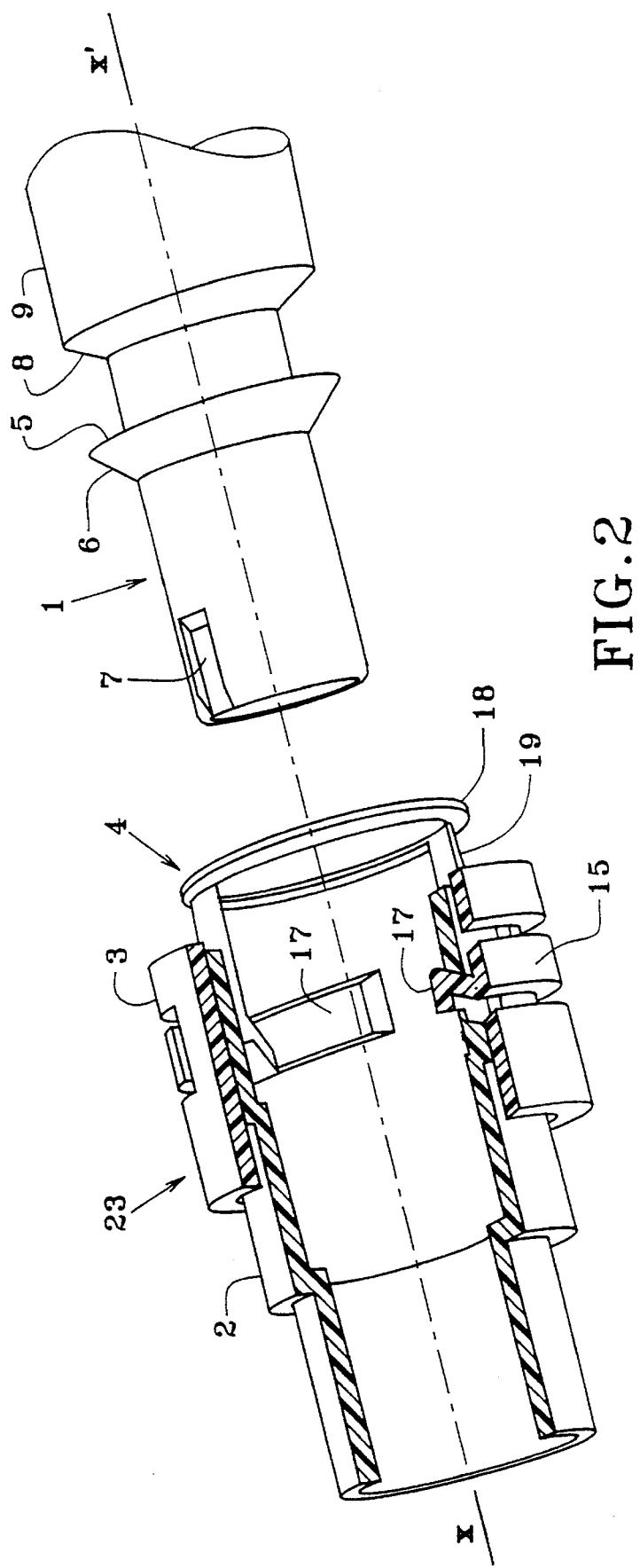
Figure 3:
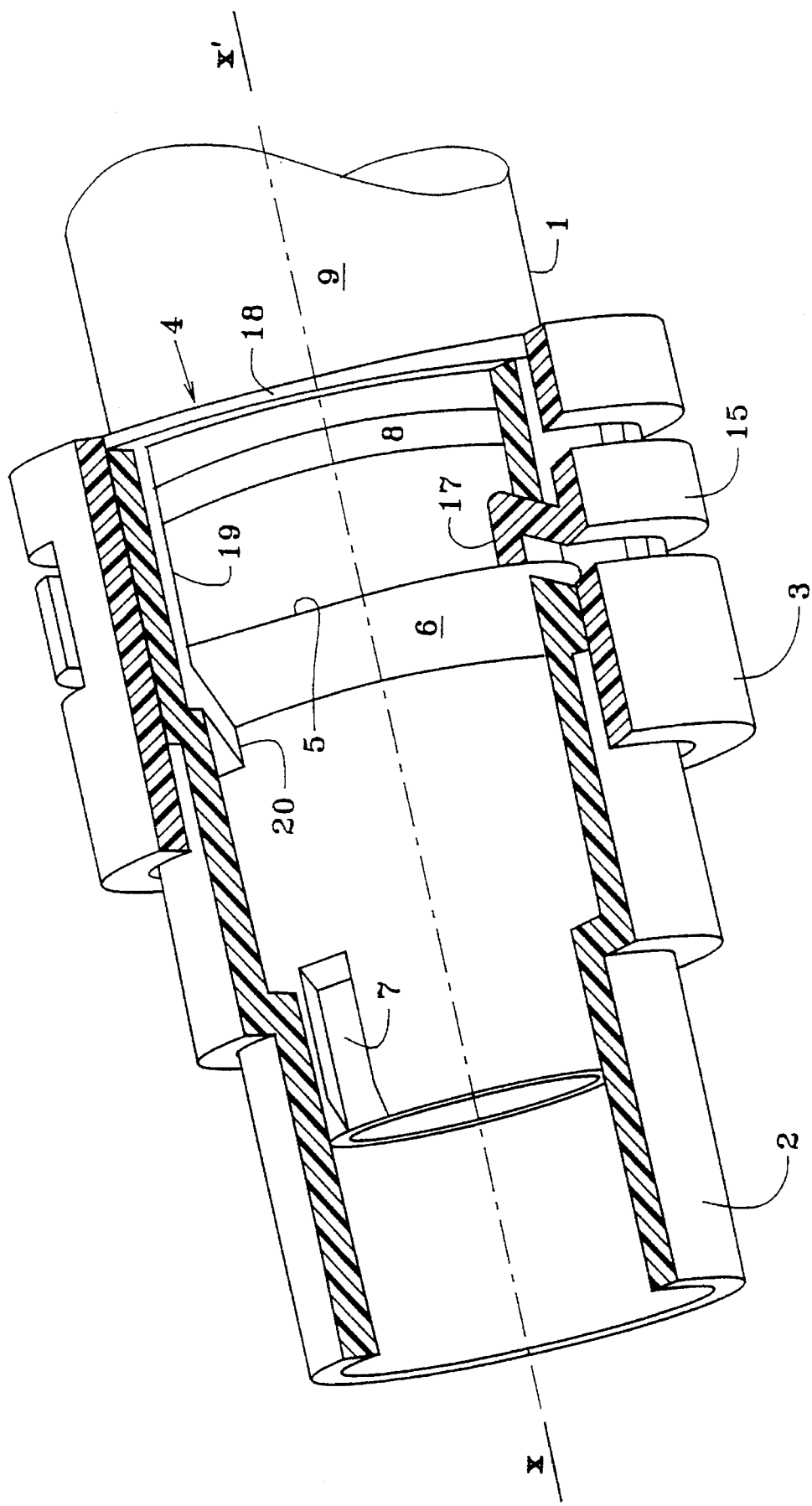
Figure 4:
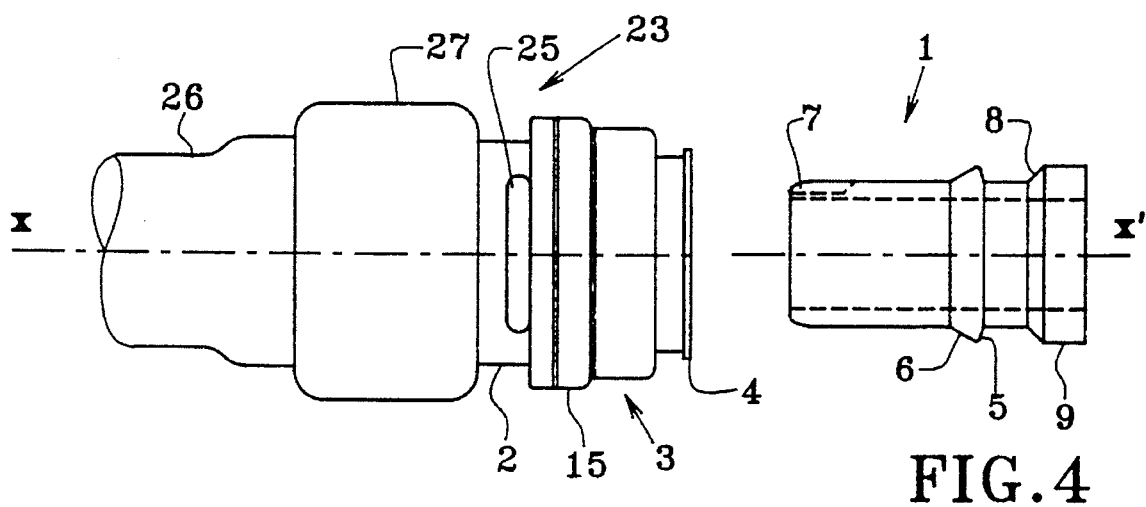
Figure 5:
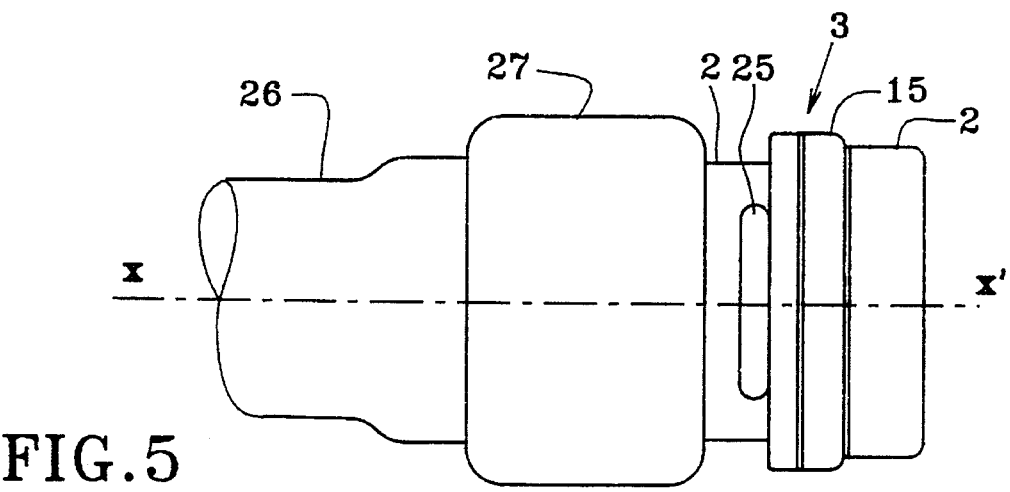
Figure 6:
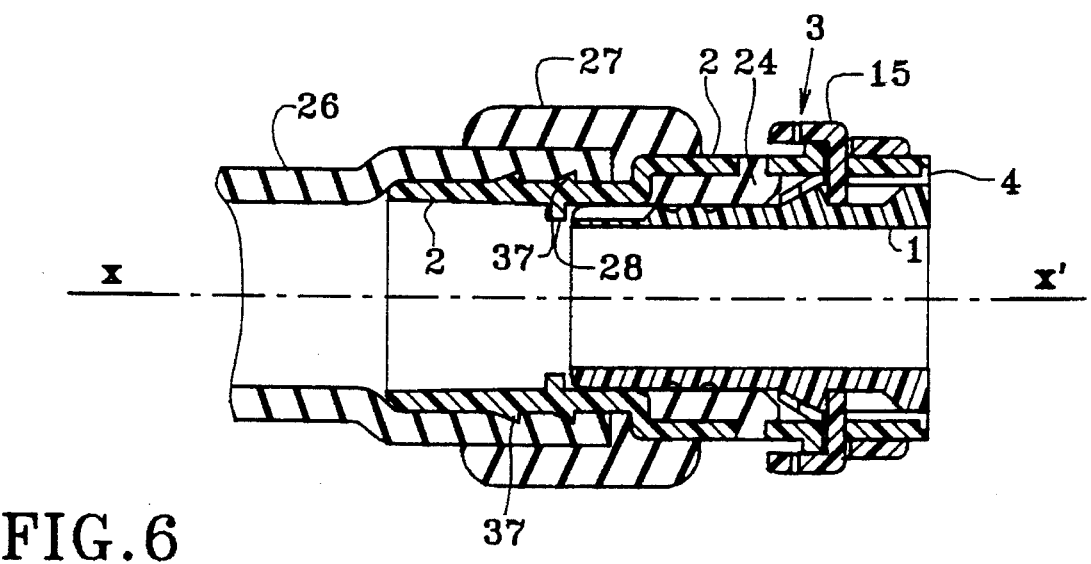
Figure 16:
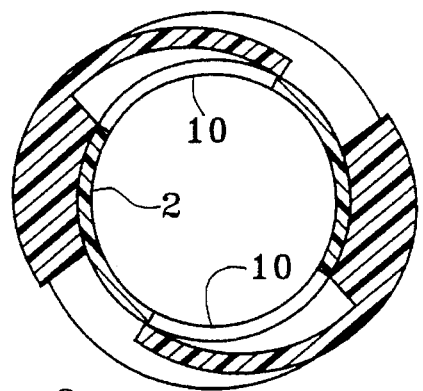
Figures 11, 15:
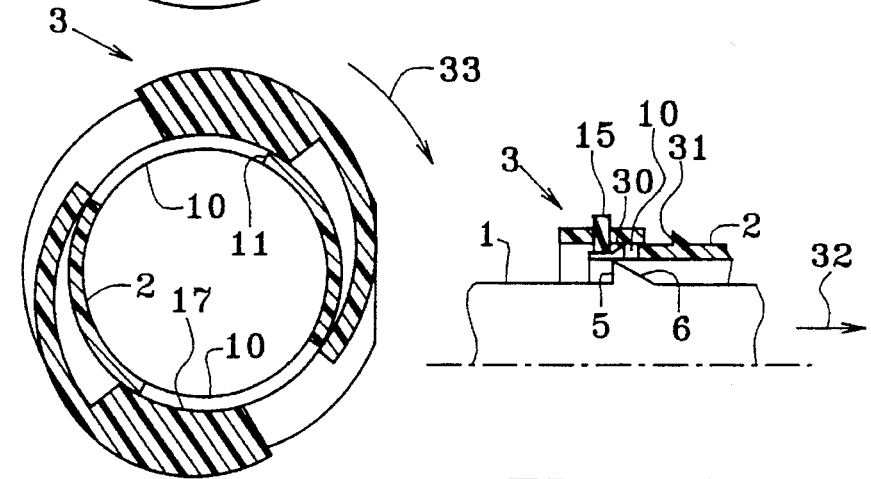
Figures 13, 14:
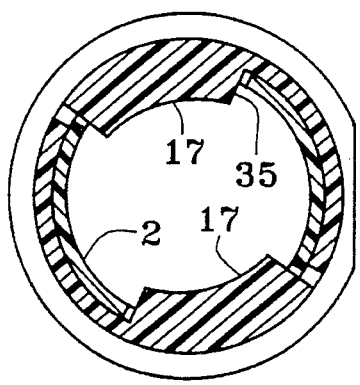
Figure 12:
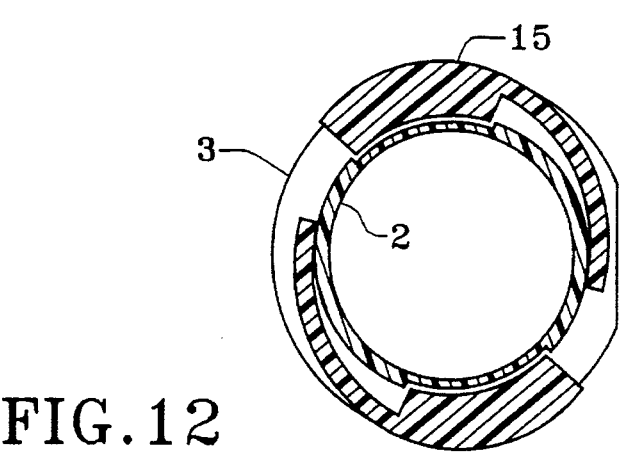
Figure 30:
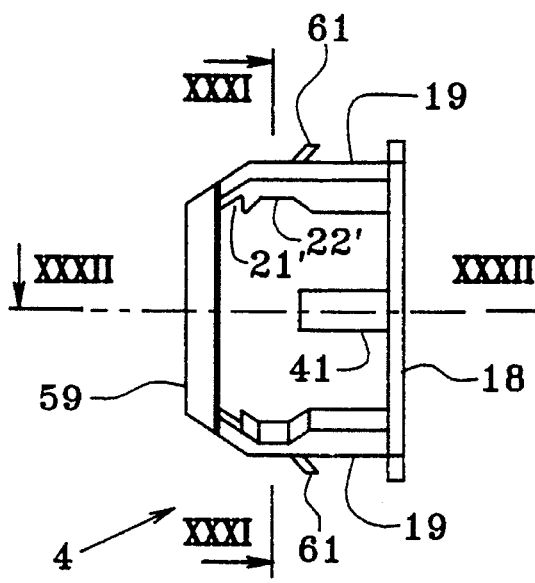
Figure 31:
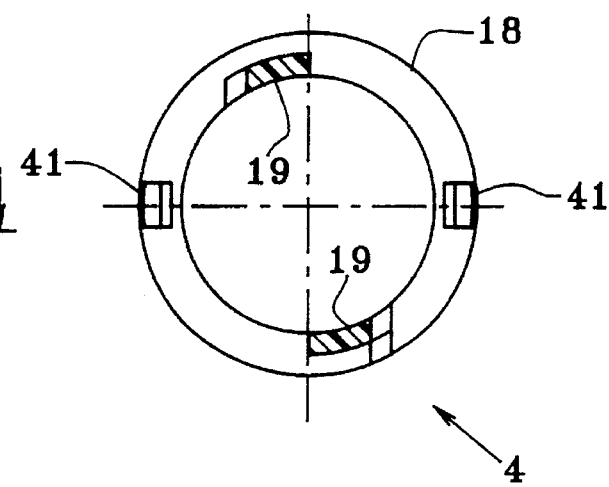
Figure 32:
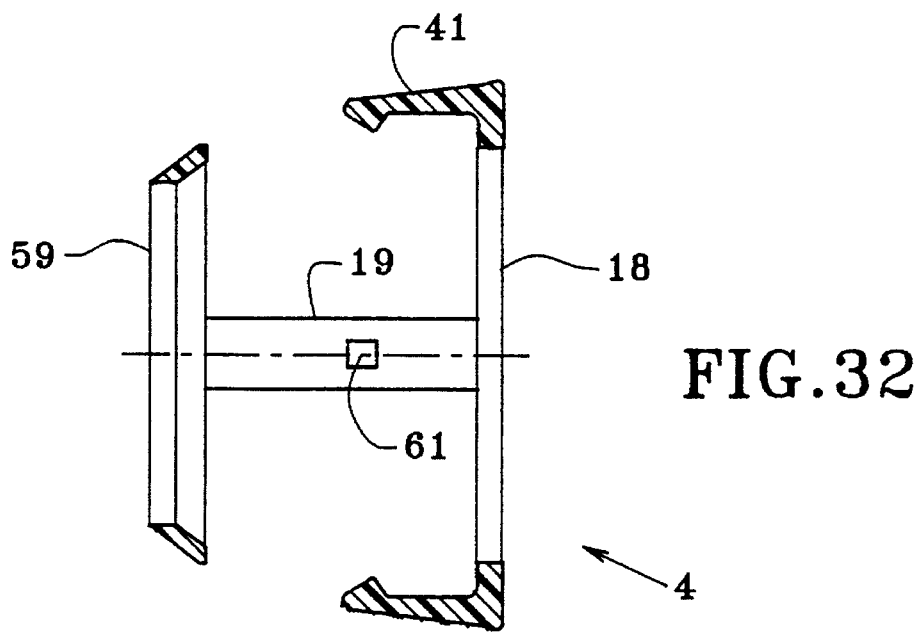
Figures 33, 34:
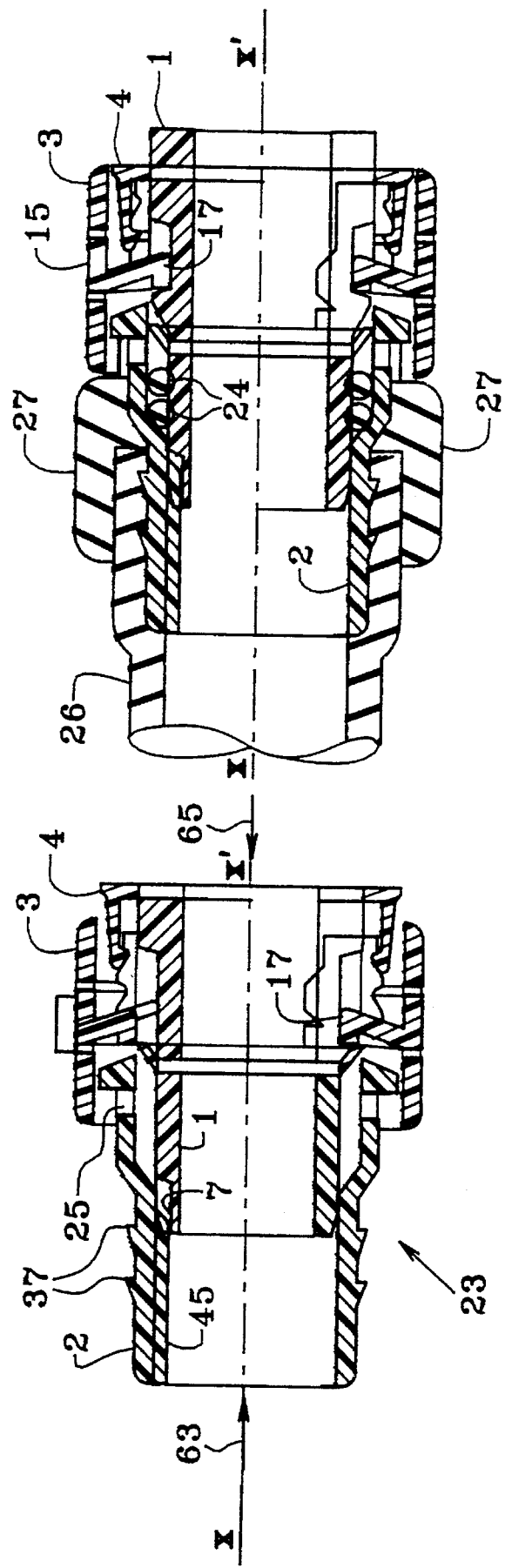

The invention will be better understood by means of the description below and of the appended figures given as non-limiting examples and in which:

FIG. 1 is an exploded perspective view of one embodiment of the joining device according to the present invention;

FIG. 2 is a perspective view with partial cut-away of the joining device according to the present invention in a non-joined condition;

FIG. 3 is a view similar to FIG. 2, in a joined condition;

FIG. 4 is a longitudinal view of a second embodiment of the joining device according to the present invention in a non-joined condition;

FIG. 5 is a view similar to FIG. 4 in a joined condition;

FIG. 6 is a sectional view of the device of FIG. 5;

FIGS. 7a–c includes three sectional views of the lugs which can be employed in a joining device according to the present invention;

FIG. 8 is a radial section of the device according to the present invention, upon disassembly;

FIG. 9 is an axial view of a third embodiment of the device according to the present invention in a non-joined condition;

FIG. 10 is a view in axial section of the device of FIG. 9 in a joined condition;

FIG. 11 is an axial section of the third embodiment of a device according to the present invention in a non-joined condition;

FIG. 12 is a view in radial section of the device of FIG. 11;

FIG. 13 is a longitudinal section of the device of FIG. 11 in a joined condition;

FIG. 14 is a view in radial section of the device of FIG. 13 in the joined condition;

FIG. 15 is a radial section of the device of FIG. 13 upon disassembly in a position allowing resetting;

FIG. 16 is a radial section of the device after disassembly;

FIG. 17 is a longitudinal view of the preferred embodiment of a female connector according to the present invention;

FIG. 18 is a view in longitudinal section of the female connector of FIG. 17;

FIG. 19 is a first radial section of the female connector of FIG. 17;

FIG. 20 is a second radial section of the female connector of FIG. 17;

FIG. 21 is a longitudinal view of a second alternative of the preferred embodiment of a female connector according to the present invention;

FIG. 22 is a longitudinal section of the female connector of FIG. 21;

FIG. 23 is a first radial section on a larger scale of the female connector of FIG. 21;

FIG. 24 is a second radial section of the female connector of FIG. 21;

FIG. 25 is a longitudinal view of the preferred embodiment of a locking ring according to the present invention;

FIG. 26 is a first longitudinal section of the locking ring of FIG. 25;

FIG. 27 is a front-on view of the locking ring of FIG. 25;

FIG. 28 is a second view in longitudinal section of the locking ring of FIG. 25;

FIG. 29 is a radial section, on a larger scale, of the locking ring of FIG. 25;

FIG. 30 is a longitudinal view of the preferred embodiment of the telltale according to the present invention;

FIG. 31 is a radial section of the telltale of FIG. 30;

FIG. 32 is a longitudinal section of the telltale of FIG. 30;

FIG. 33 is a longitudinal section of a device according to the present invention during assembly;

FIG. 34 is a sectional view of a device according to the present invention, assembled.

DETAILED DESCRIPTION

In FIGS. 1 to 34 the same references have been used to denote the same elements.

FIG. 1 shows a joining device with axis xx' according to the present invention, including a first tubular element 1 and a second tubular element 2 to be joined, a locking ring or sleeve tube 3 and a joining and/or locking telltale 4.

In an advantageous example of FIG. 1, the first tubular element 1 is a male tubular joining piece including a retaining element 5, for example an annular shoulder, the opposite flank of which includes a frustoconical ramp forming an angle of between 20° and 30°, for example, with the axis of the joining piece. Advantageously, the joining piece 1 includes an angular reference mark 7, for example a recess made in the outer wall of the joining piece at its joining end. Behind the ramp 6, that is to say opposite the joining end, the joining piece 1 advantageously includes a frustoconical bearing surface 8 providing the transition towards a region 9 which has a larger diameter than that of the joining end of the joining piece 1.

The second tubular element 2 has, in the region of the joining end, an inside diameter which is slightly greater than the outside diameter of the tubular element 1, so as to form a female connector, the tubular element 1 forming a male joining piece. The second tubular element 2 includes at least one, and preferably two, slots 10, advantageously located symmetrically relative to a plane passing through the axis xx' of the joining device.

Advantageously, the slot or slots 10 has (have) an elongate shape extending substantially parallel to a diameter of the second tubular element. As will be explained below, one end of each slot 10 of one embodiment of the joining device allowing the tubular elements 1 and 2 to be disconnected includes a ramp 11. In contrast, the ends of the slots 10 of another embodiment of the joining device preventing the tubular elements from being disconnected end in an abrupt edge, for example in a plane surface turned toward the axis xx'.

The outer surface of the second tubular element 2 of this embodiment advantageously comprises, in the angular extension of each slot 10, a first region 12 of a first diameter followed by a second region 13 of a diameter which is larger than the diameter of the first region 12, or a flat. Advantageously, the inner face facing the second region 13 includes an elongate cavity 14 for angular referencing and/or for guidance parallel to the axis xx'.

The locking ring or sleeve tube 3 has an inside diameter which is slightly greater than the outside diameter of the tubular element 2. Corresponding with each slot 10 of the second tubular element 2 there is a lug 15 including an elastic tab 16 bearing a projecting element 17, the shape of which complements that of the corresponding slot 10, but the thickness of which is greater than the depth of this slot 10.

Advantageously, the projecting elements 17 include, at least at one of their ends, a ramp 35 making it easier to unlock the device according to the present invention by rotation, with the slots 10 of the second tubular element 2 sliding over the ramps 11.

The joining and/or locking telltale includes a ring 18, the inside diameter of which is greater than the outside diameter of the joining end of the joining piece 1 and the outside diameter of which is slightly less than the inside diameter of the locking ring 3, as well as a sleeve tube or, as illustrated, tabs 19 extending substantially perpendicularly to the plane of the ring 18. Each tab 19 advantageously includes one end 20 curved towards the axis xx' as well as two notches 20 and 21 for accommodating the projecting elements 17 of the lugs 15. The telltale 4 is advantageously in a contrasting color relative to that of the locking ring 3 and of the first tubular element 1.

FIG. 2 shows the male tubular joining piece and a female connector 23 including a tubular element 2, the locking ring 3 and the joining and/or locking telltale 4 assembled together. The locking ring 3 is fitted around the second tubular element 2, the projecting element or elements 17 penetrating into the slot or slots 10. The tabs 19 of the telltale 4 penetrate inside the second tubular element 2, the first notches 21 receiving the projecting elements 17 of the lugs 15 of the locking ring 3 (which are not visible in FIG. 2). The ring 18 and a part of the tabs 19 extend beyond the second tubular element 2 and the locking ring 3.

It may be noted that the ring 3 and the telltale 4 of the female connector 23 are held fast in terms of translation along the axis xx' and are thus captive. What is more, the tabs 19 of the telltale 4 may include an elastic lug which, during the fitting of the connector 23, engages in an axially elongate slot (which are not represented).

The change from the disconnected condition of FIG. 2 to the assembled condition of FIG. 3 takes place by aligning the axes of the first tubular element 1 with the axis of the second tubular element 2 and by a translation movement along the common axis xx' with the male connection piece 1 penetrating inside the female connector 23. The ramp 6 pushes back the projecting elements 17 of the lugs 15 which release the tabs 19 of the telltale 4 which is driven in translation by the male joining piece 1 until immobilization is obtained through the locking of the projecting element 17 of the lugs 15 in the second notches 22 and, simultaneously, their snap-fastening in the region of the shoulder 5 of the male joining piece 1. The translation movement of the telltale 4 causes it to disappear inside the locking ring 3.

It may prove necessary to allow disconnection of the tubular elements 1 and 2 of the joining device according to the invention, for example for the purposes of inspection, test, modifying the circuit, or replacing a component. The joining device may be unlocked, for example, by extracting the lugs 15 from the slots 10. Disconnection is achieved by moving apart the projecting elements 17 of the lugs 15 immobilizing the shoulder 5 of the male joining piece 1. At that instant, pulling on the female connector 23 and on the male joining piece 1 in opposite directions will cause disconnection. Advantageously, unlocking, particularly the extraction of the lugs 15, is achieved without the use of tools, In an advantageous alternative which has not been represented, the telltale 4 is equipped with an elastic element, particularly a boss which, upon unlocking, causes the telltale to return to its visible position.

It may prove advantageous to improve the sealing of the joining device according to the present invention by locating a seal, for example, made of an elastomer or of a plastic, between the first and second tubular elements. Advantageously, the seal 24 is molded directly by injection-molding inside the female connector 23. An example of such a joining device according to the invention including such an injection molded seal is illustrated in FIGS. 4 to 6. The second tubular element 2 includes an injection orifice 25 allowing molding 24.

In the embodiment of FIGS. 4 to 6, the second tubular element is an insert, for example made of plastic, forcibly penetrating inside a tubular pipe 26, for example a rubber hose. Advantageously, the second tubular element is equipped on its outer face with radial retaining ribs 37 referred to as being of the "fir-tree" type. Advantageously, a sleeve tube 27 reinforces the join between the flexible rubber tubular pipe 26 and the second tubular element 2. Advantageously, the second tubular element 2 includes an internal shoulder 28 forming an end of travel stop for the penetration of the male joining piece 1.

Separation pulling forces $\vec{T}$ and $\vec{T}$ (FIG. 7a) exerted in opposite directions on the tubular elements 1 and 2 will cause the retaining element 5 of the tubular element 1 to bear on the projecting part 17 of the lug 15. If the retaining element 5 is not perfectly radial, that is to say perpendicular to the axis xx', this results in a force having a radial component $\vec{F}$ lifting the lugs 15 which force, if it exceeds the elastic return force of the tongues 16, may cause accidental disconnection of the device according to the invention.

FIG. 7 shows three advantageous embodiments for the shape of the projecting elements 17 of the lugs 15 making it possible to resist strong pulls on the joining device according to the invention, without accidental disconnection. In order to increase the magnitude of the traction forces which cause accidental disconnection, it is possible, as illustrated in FIG. 7a, to incline the side of the projecting elements 17 of the lugs 15 as well as the radial contact surface of the slots 10 oriented on the connection end side of the tubular element 2. An inclination of between 10° and 30° makes it possible to withstand a tension of 30 daN without disconnection. A Z-shaped profile is used for example. The outer horizontal bar of the Z forms an elastic element, particularly the tab 16. The inner horizontal bar of the Z forms the element for fastening onto the retaining element 5 of the male joining piece 1. The oblique bar of the Z linking the two horizontal elements provides a reaction force to a force tending to move the lugs radially following a separating tension on the joining device according to the present invention.

FIG. 7b shows a lug 15 in which the projecting element 17 includes an axial stop B pointing toward the retaining element 5. The total width of the projecting element 17 including the stop B is substantially equal to the width of the slots 10. Upon joining, the locking ring 3 moves slightly so that, as illustrated in FIG. 7b, the stop B is covered by the inner wall of the second tubular element 2.

It is clearly understood that the inclination of the sides of the projecting element 17 of the lug 15 and the stop B may be combined, as illustrated in FIG. 7c.

FIGS. 9 and 10 show an alternative embodiment of the joining device according to the present invention including a tubular element 2 externally joined to a flexible tubular pipe 26, for example made of elastomer, via a bead or collar 29, for example made of elastomer.

The telltale 4 of the embodiments of FIG. 4, 5, 6, 9 and 10 is concealed, in the locked condition, by the second tubular element 2 and not by the locking ring 3.

FIGS. 11 to 13 show an embodiment of a joining device according to the present invention including a locking ring 3 which slides on the second tubular element 2.

The second tubular element 2 advantageously includes a ramp 30 leading to the slot 10 and a stop 31 for preventing translational movement of the locking ring 3. Before joining, the lugs 15 are in a projecting position illustrated in FIGS. 11 and 12. Locking is obtained by a translational movement of the tubular joining piece and of the ring 3 in the direction of the arrow 32. The lugs 15 penetrate into the slot 10 and immobilize the retaining elements 5 of the male joining piece 1. Unlocking is obtained, as in the case of the alternative embodiments of the preceding figures, by rotating the locking ring 3 relative to the second tubular elements 2 in the direction of the arrow 33. This rotation is facilitated by the presence of a ramp 11 on one of the ends of the slot 10 and of a ramp 35 on the projecting element 17 of the lug 15. FIGS. 15 and 16 illustrate the unlocking of the joining device according to the present invention. FIG. 15 shows the ring 3 in an unlocked condition, the projecting element 17 of the lug 15 resting in the region 12. If the ring 3 is released in this position, the projecting element 17 comes back into the slot 10 through the elasticity of the lug 15. The locking of the joint is automatically reset. By continuing to turn the ring 3 in the direction of the arrow 33, the lug 15 penetrates into the second region 13 in which it rests in a stable manner. From this position on, automatic resetting of the locking is not obtained. The unlocking of the alternative embodiment of the device according to the invention including a stop B in the region of the lugs 15 may require a slight axial movement of the locking ring 3 relative to the second tubular element 2.

Unlocking using rotation of FIGS. 14 to 16 applies also, advantageously, to the other alternatives of the device according to the present invention insofar as it is desired to give them the capability for disconnection.

FIGS. 17 to 20 show one of the preferred embodiments of the second tubular element 2 according to the present invention, substantially identical with the second tubular element 2 of FIGS. 4 to 6 but further including retaining elements 39, particularly notches, hooks 41 on the telltale 4 of FIGS. 30 to 32, lugs 43 forming a stop limiting the rotation of the locking ring 3 and a rib 45 for angular positioning relative to the male joining piece 1. The rib 45 has a shape which complements the recess 7 made in the male joining piece 1.

Without this in any way being of limiting nature, the region 12 past which automatic resetting of the locking by the ring 3 is obtained, ends in an abrupt edge 47 which does not allow rotation of the locking ring 3 to be continued toward the second region 13 which has a larger diameter.

FIGS. 21 to 24 show the preferred embodiment of a second tubular element 2 of the type which joins externally onto a flexible tubular pipe 26 via a bead or a collar 29. The second tubular element of FIGS. 21 to 24 includes, apart from the improvements of the second tubular element of FIGS. 17 to 20, two ribs 49 for positioning the male joining piece. Furthermore, in the example illustrated in FIG. 23, a ramp 51 realizes the passage between the regions 12 and 13. The latter makes it possible, by supporting the lugs 15 of the locking ring, to keep the device according to the present invention stable in an unlocked condition. It is clearly understood that, without departing from the scope of the present invention, the second tubular element of FIGS. 21 to 24 can be equipped with an abrupt rim 47 (FIG. 19) or that the second tubular element 2 of FIGS. 17 to 20 can be equipped with the ramp 51 without departing from the scope of the present invention.

FIGS. 25 to 29 show the preferred embodiment of a locking ring 3 in which the lugs 15 have a radial extension separated by a radial slit 53 extending substantially over half the extension of the lugs 15 of a tab 55. Advantageously, the locking ring 3 can turn in the direction of the arrows 56 in order to carry out unlocking, this rotation being limited by lugs 57 abutting against the lugs 43 of the second tubular element 2. Advantageously, the locking ring includes an indication 56' of the direction of rotation for unlocking.

FIGS. 30 to 32 show the preferred embodiment of a telltale 4 according to the present invention comprising, at the opposite ends of the tabs 19 from those secured to the ring 18, a ring 59, for example a frustoconical one. Furthermore, the notches 21 and 22 are formed on the internal faces of the tabs 19 and not, as in the case of FIG. 1, on the outer faces of these tabs. In the embodiment represented, the ring 18 furthermore bears hooks 41 which clip into the retaining elements 39 of the second tubular element 2. The hooks 41 are located on the connector 23 between the second tubular element 2 and the locking ring. The hooks 41 make the telltale 4 captive. As an alternative, the hooks 41 can be replaced by external lugs 61 mounted on the tabs 19, the corresponding second tubular element comprising not the retaining elements 39 formed on its outer face, but recesses or slots emerging on its inner face.

FIG. 33 shows the device of FIGS. 17 to 20 and 25 to 32 in the course of assembly (the tubular pipe 26, the overmolded sleeve tube 27 and the seal 24 are not represented in this figure). The female connector 23 and/or the male joining piece 1 are brought together respectively in the direction of the arrows 63 and 65 along the axis xx'. The recess 7 takes the rib 45, which guides the joining piece 1 in terms of angle relative to the connector 23. The projecting elements 17 of the lugs 15 of the locking ring 3 are moved apart by the ramp 6, then lock the male joining piece 1. The telltale 4 is driven inside the device and disappears, concealed by the locking ring 3, as illustrated in FIG. 34 and/or by the second tubular element 2. FIG. 34 shows the device according to the present invention in the locked condition. Apart from the elements of FIG. 33, the flexible tubular pipe 26, for example a rubber hose, the overmolded sleeve tube 27 and also the seal 24 have been represented here. In the example of this figure, the seal 24 is symbolized by two O-rings, it being clearly understood that it is advantageous to employ a seal, for example a lip seal obtained by injection through the opening 25.

The device according to the present invention includes a removable locking and/or joining telltale 4. The telltale 4 is delivered only at the request of the customer. Thus, a joining device without locking and/or joining telltale does not depart from the scope of the present invention.

The various elements of the joining device according to the present invention are produced from materials which are compatible with the stresses to which they are to be subjected, particularly as regards pressure, maximum and minimum operating temperatures and thermal cycles. The second tubular element 2 is, for example, made of plastic, particularly of polyamide 66 filled, for example, with glass fibers. The locking ring is made of polyamide or of PPS, the telltale 4 and particularly the ring 18, is made of a plastic of highly visible color, the metal tubular joining piece 1 is, for example, made of metal or plastic.

It is clearly understood that the present invention is not limited to the joining device 3, but applies equally well to a joining device bent at right angles or some other angle (not represented).

The present invention applies to the fluid circuit, particularly the pneumatic circuit, liquid circuit, particularly water or oil circuit for low, medium or high temperatures and for low, medium or high pressures.

The present invention applies mainly to the motor industry and, particularly to the joining of the engine cooling circuit to the water box of a unit heater or to the joining of a medium-pressure oil circuit of a motor vehicle power-assisted steering circuit.

We claim:

1. A device for sealed joining of a first tubular element with a second tubular element for a fluid circuit, comprising means for locking the first and second tubular elements in a joined condition and a telltale including a ring which is visible before joining, and wherein the device includes a component concealing the ring of the telltale after the first and second tubular elements have been joined together, wherein the first tubular element is a male joining piece comprising a retaining element including a ramp forming an angle with the longitudinal axis of the male joining piece, and wherein the second tubular element has, at an end adjacent the first tubular element when joined therewith, an inside diameter slightly greater than the outside diameter of the male joining piece and includes at least one slot, wherein the device further includes a locking ring surrounding the second tubular element comprising at least one elastic lug which, at least when the first and second tubular elements are joined, passes through the slot of the second tubular element, wherein, upon joining, the at least one lug is pushed back by the ramp and then is locked by the retaining element, and wherein the telltale includes the ring which is visible when the first and second tubular elements are unjoined, and an element which is pushed back, upon joining, by the male joining piece so that the ring of the telltale becomes housed in the locking ring which conceals its presence.

2. The device as claimed in claim 1, wherein the at least one lug, viewed in cross-section taken along a line parallel with the longitudinal axis of the device, has a Z shape configuration defined substantially by an outer horizontal bar, an inner horizontal bar, and an oblique bar extending therebetween, wherein the inner horizontal bar extends from the oblique bar in a direction away from the end of the second tubular element which is joined with the first tubular member.

3. The device is claimed in claim 1, wherein the at least one lug and the at least one slot of the second tubular element have an elongate shape and are located radially about an axis of the joining device, and wherein the end of each lug or the edge of each slot includes a ramp making it possible to turn the locking ring, disengaging the lugs from the retaining element of the male joining piece in order to disconnect the joining device.

4. The joining device as claimed in claim 3, wherein the at least one lug of the locking ring is elastic and the lug and the slot of the second tubular element are configured to assume a first position wherein the at least one lug returns into the at least one slot of the second tubular element in order to reset the locking device automatically.

5. The device as claimed in claim 4, wherein the locking ring and the second tubular element are further configured such that the at least one lug rests on the outer surface of the second tubular element in a second position when not elastically mated with the at least one slot.

6. The joining device as claimed in claim 1, wherein the joining or locking telltale is removable.

7. The joining device as claimed in claim 1, wherein the joining or locking telltale includes means for return to the visible position after disconnection.

8. The device as claimed in claim 1, wherein the second tubular element includes means for axially immobilizing the locking ring in terms of translation, preventing the axial translation of the locking ring relative to the second tubular element.

9. The device as claimed in claim 8, wherein the second tubular element includes means for guiding the locking ring in translation between the second position in which the at least one lug rests on the outer surface of the second tubular element and the first position in which the at least one lug is engaged in the at least one slot formed in the second tubular element.

* * * * *